(12) United States Patent
Hsu

(10) Patent No.: US 8,390,942 B2
(45) Date of Patent: Mar. 5, 2013

(54) OPTICAL LENS MODULE

(75) Inventor: Yun-Chiang Hsu, Taoyuan County (TW)

(73) Assignees: OmniVision Technologies, Inc., Santa Clara, CA (US); VisEra Technologies Company Limited, Hsinchu (TW)

( * ) Notice: Subject to any disclaimer, the term of this patent is extended or adjusted under 35 U.S.C. 154(b) by 104 days.

(21) Appl. No.: 13/004,518

(22) Filed: Jan. 11, 2011

(65) Prior Publication Data
US 2012/0176690 A1 Jul. 12, 2012

(51) Int. Cl.
*G02B 3/02* (2006.01)
*G02B 9/12* (2006.01)

(52) U.S. Cl. ........................ 359/716; 359/784

(58) Field of Classification Search .................. 348/340; 359/716, 739, 784, 797
See application file for complete search history.

(56) References Cited

U.S. PATENT DOCUMENTS

| 8,194,334 B2* | 6/2012 | Hsu et al. | 359/784 |
| 8,279,535 B2* | 10/2012 | Hsu et al. | 359/717 |
| 8,289,634 B2* | 10/2012 | Deng et al. | 359/796 |
| 2010/0309368 A1* | 12/2010 | Choi et al. | 348/360 |
| 2010/0315724 A1* | 12/2010 | Fukuta et al. | 359/716 |

* cited by examiner

*Primary Examiner* — David N Spector
(74) *Attorney, Agent, or Firm* — Muncy, Geissler, Olds & Lowe, PLLC

(57) ABSTRACT

An optical lens module is provided, including a first lens, a second lens, a third lens, and an aperture stop formed in the first lens by wafer level processing. The first lens, the second lens, and the third lens are sequentially arranged from an object side to an image side along an optical axis of the optical lens module. The first lens has a convex surface and a concave surface, respectively, on an object side and an image side. The second lens has a concave surface and a convex surface, respectively, on the object side and the image side. The third lens has a convex peripheral portion on the image side, wherein the convex peripheral portion forms a surface with a concave center on the image side, and the surface has an inflection point.

14 Claims, 4 Drawing Sheets

OPTICAL LENS MODULE

BACKGROUND OF THE INVENTION

1. Field of the Invention

This application relates in general to an optical lens module and in particular to an optical lens module with an aperture stop embedded in a lens thereof.

2. Description of the Related Art

Conventional portable cell telephones may comprise a built-in digital camera with an optical lens module. When designing the optical lens module, the ratio of the optical length to the composite focal distance of the optical lens module must be minimized. Design of the optical lens module has become very difficult, as cell telephones are being designed more thin and compact. Moreover, as conventional aperture stop and lenses are usually individual parts assembled to each other, robust connection and accurate positioning therebetween have become a significant challenge.

BRIEF SUMMARY OF INVENTION

An object of the application is to provide an optical lens module with an aperture stop embedded therein. The optical lens module includes a first lens, a second lens, a third lens, and an aperture stop formed in the first lens by wafer level processing. The first lens, the second lens, and the third lens are sequentially arranged from an object side to an image side along an optical axis of the optical lens module. The first lens has a convex surface and a concave surface, respectively, on the object side and the image side. The second lens has a concave surface and a convex surface, respectively, on the object side and the image side. The third lens has a convex peripheral portion on the image side, wherein the convex peripheral portion forms a surface with a concave center on the image side, and the surface has an inflection point.

BRIEF DESCRIPTION OF DRAWINGS

The invention can be more fully understood by reading the subsequent detailed description and examples with references made to the accompanying drawings, wherein.

DETAILED DESCRIPTION OF INVENTION

First Embodiment

Figure 1:
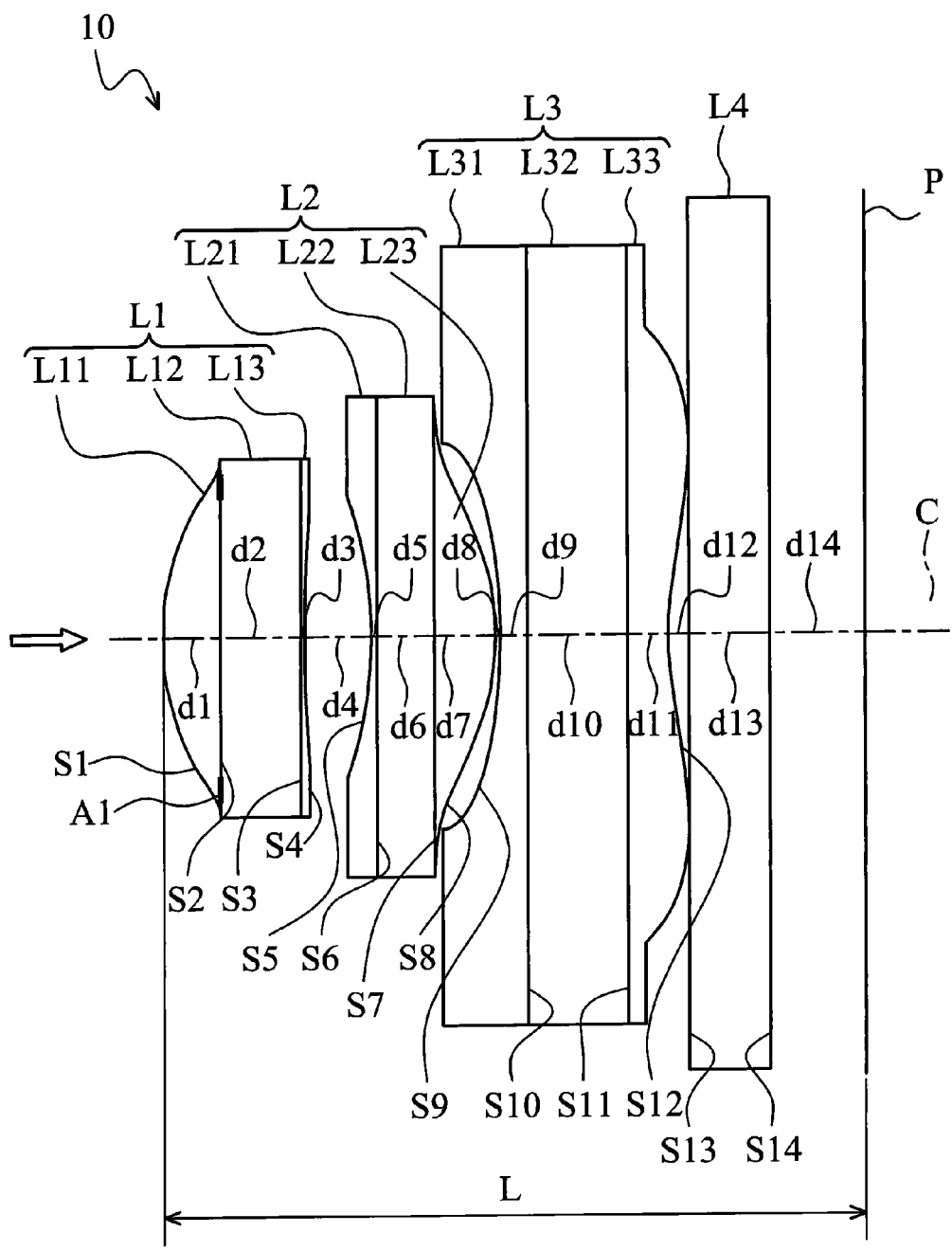
FIG. 1 is a perspective diagram of an optical lens module according to the first embodiment of the invention.

Referring to FIG. 1, the first embodiment of an optical lens module 10 primarily comprises a first lens L1, a second lens L2, a third lens L3, and a plane parallel plate L4. Light can enter the first lens L1 from an object side and sequentially pass through the second lens L2, the third lens L3, and the plane parallel plate L4 to an image side. As shown in FIG. 1, an image sensing plane P of an imaging sensor, such as a CCD (Charge Coupled Device), is disposed on the image side of the lens module 10 to receive light.

In this embodiment, the first lens L1 may be a compound lens comprising three sub-lenses L11-L13. Similarly, the second lens L2 may be a compound lens comprising three sub-lenses L21-L23, and the third lens L3 may be a compound lens comprising three sub-lenses L31-L33. The sub-lenses L12, L22, and L32 may be plane parallel glass plates, and the other sub-lenses L11, L13, L21, L23, L31, and L33 may comprise curable resin material, such as transparent curable silicone resin or UV-curable material.

Specifically, an aperture stop A1 (diaphragm) is formed in the first lens L1 by wafer level processing to define the position of the entrance pupil. In this embodiment, the aperture stop A1 is formed on the surface S2 between the sub-lenses L11 and L12. Since the aperture stop A1 is securely fixed and embedded in the first lens L1 by wafer level processing, accurate positioning and robust connection between the aperture stop M and the first lens L1 are achieved.

Table 1-1 and 1-2 illustrate the design parameters of the optical lens module 10 in FIG. 1, wherein the optical lens module 10 has a focal ratio F=2.8.

TABLE 1-1

| Surface | Radius of Curvature | Distance (mm) | Refractivity | Abbe Number |
|---|---|---|---|---|
| S1 | 1.04 | | | |
| | | d1 = 0.28 | 1.475 | 59.5 |
| S2 (aperture stop) | ∞ | | | |
| | | d2 = 0.40 | 1.516 | 62.6 |
| S3 | ∞ | | | |
| | | d3 = 0.02 | 1.475 | 59.5 |
| S4 | 14.84 | | | |
| | | d4 = 0.34 | | |
| S5 | −1.56 | | | |
| | | d5 = 0.02 | 1.591 | 31 |
| S6 | ∞ | | | |
| | | d6 = 0.30 | 1.516 | 62.6 |
| S7 | ∞ | | | |
| | | d7 = 0.30 | 1.591 | 31 |
| S8 | −0.87 | | | |
| | | d8 = 0.02 | | |
| S9 | −2.94 | | | |
| | | d9 = 0.14 | 1.591 | 31 |
| S10 | ∞ | | | |
| | | d10 = 0.50 | 1.516 | 62.6 |
| S11 | ∞ | | | |
| | | d11 = 0.20 | 1.596 | 49.5 |
| S12 | 1.47 | | | |
| | | d12 = 0.10 | | |
| S13 | ∞ | | | |
| | | d13 = 0.40 | 1.516 | 62.6 |
| S14 | ∞ | | | |
| | | d14 = 0.47 | | |

TABLE 1-2

| Surface | Aspheric Coefficiencies | | | | | | | |
|---|---|---|---|---|---|---|---|---|
| | K | A4 | A6 | A8 | A10 | A12 | A14 | A16 |
| S1 | −0.015903981 | 0.010661737 | 0.101027391 | −1.041507211 | 4.987836924 | −7.322415588 | | |
| S2 (aperture stop) | | | | | | | | |
| S3 | | | | | | | | |
| S4 | | 0.107518332 | 0.09460356 | 0.639419603 | 0.011888898 | −2.414736278 | | |
| S5 | −2.115726541 | −0.088633717 | 0.894786326 | −3.611759143 | 10.23364604 | −11.60821937 | | |
| S6 | | | | | | | | |
| S7 | | | | | | | | |
| S8 | −0.62551149 | 0.174298024 | 0.032905937 | 0.237108666 | 0.273944609 | −0.36201161 | | |
| S9 | | −0.326900121 | 0.14702227 | −0.153167051 | 0.170726554 | −0.416487816 | | |
| S10 | | | | | | | | |
| S11 | | | | | | | | |
| S12 | −8.536388923 | −0.190089713 | 0.088904108 | −0.045077698 | 0.004423103 | 0.000324775 | 0.000923342 | −0.000329208 |
| S13 | | | | | | | | |
| S14 | | | | | | | | |

As shown in FIG. 1, Tables 1-1 and 1-2, the first lens L1 of the optical lens module 10 has a convex surface (surface S1) and a concave surface (surface S4), respectively, on an object side and an image side thereof. The second lens L2 of the optical lens module 10 has a concave surface (surface S5) and a convex surface (surface S8), respectively, on an object side and an image side thereof. In this embodiment, the third lens L3 of the optical lens module 10 has a concave surface S9 on an object side thereof. Additionally, the third lens L3 further has a convex peripheral portion on an image side thereof. Referring to FIG. 1, the convex peripheral portion forms a surface S12 with a concave center on the image side, wherein the surface S12 has an inflection point. In some embodiments, the surface S9 of the third lens L3 can also be a convex surface.

The optical lens module 10 further complies with the following conditions (1.1), (1.2), and (1.3):

$$0.2 > D12/L > 0.05 \quad (1.1)$$

$$0.2 < |EFL1|/|EFL2| < 1 \quad (1.2)$$

$$|EFL3| > |EFL1| \quad (1.3)$$

With respect to the conditions (1.1), (1.2), and (1.3), L represents the optical length of the optical lens module 10 from the object side (surface S1) of the first lens 10 to the image sensing plane P along the optical axis C. D12 represents the distance between the first and second lenses L1 and L2 along the optical axis C, as well as the distance d4 indicated in FIG. 1. EFL1, EFL2, and EFL3, respectively, represent the effective focal length (EFL) of the first, second, and third lenses L1, L2, and L3.

Figure 2:
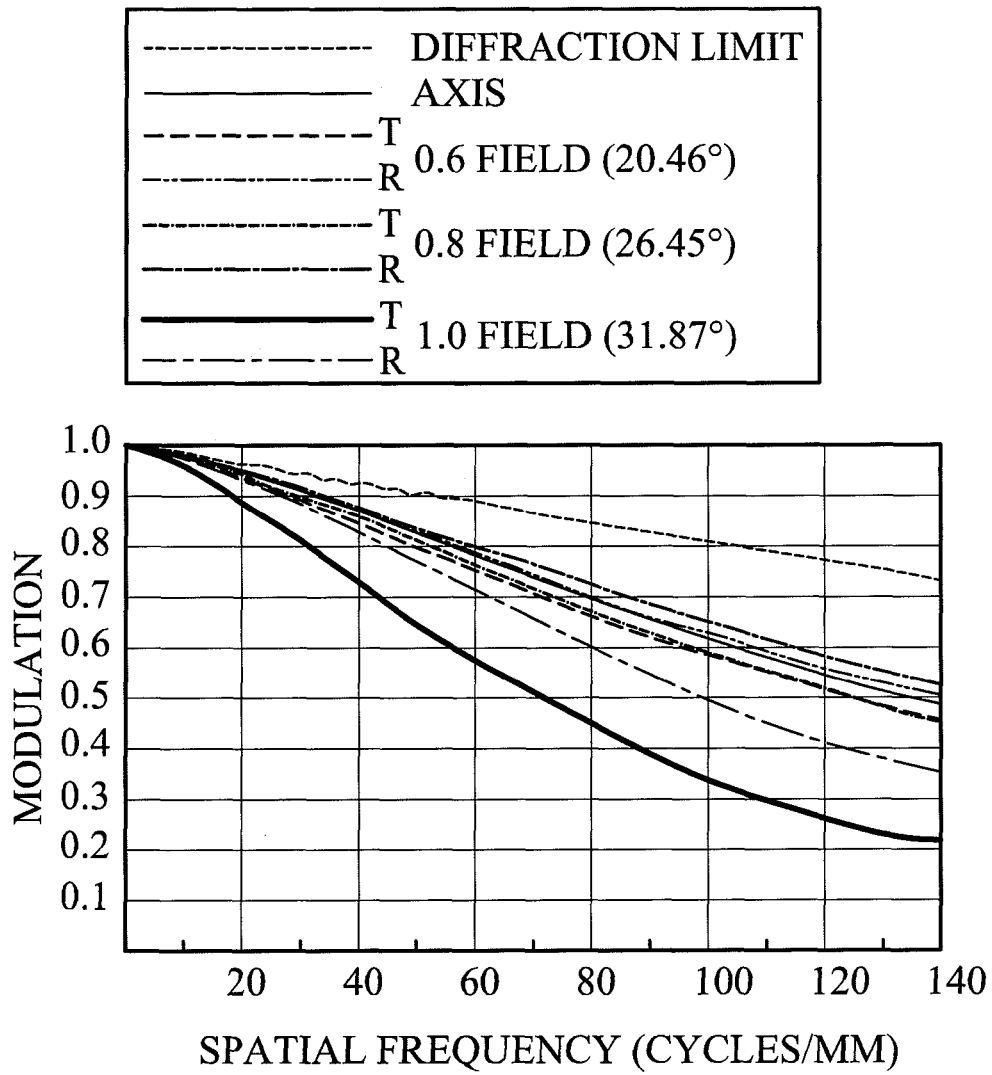
FIG. 2 is a Modulation Transfer Function (MTF) diagram showing several spatial frequency response curves according to the first embodiment of the invention.

FIG. 2 is a Modulation Transfer Function (MTF) diagram showing several spatial frequency response curves in accordance with the optical lens module 10 of FIG. 1. Referring to FIG. 2, the modulation value in the MTF diagram substantially exceeds 0.4 when the spatial frequency is below 80 cycles/mm. This denotes that the optical lens module 10 of FIG. 1 has good resolving power and contrast.

Second Embodiment

Figure 3:
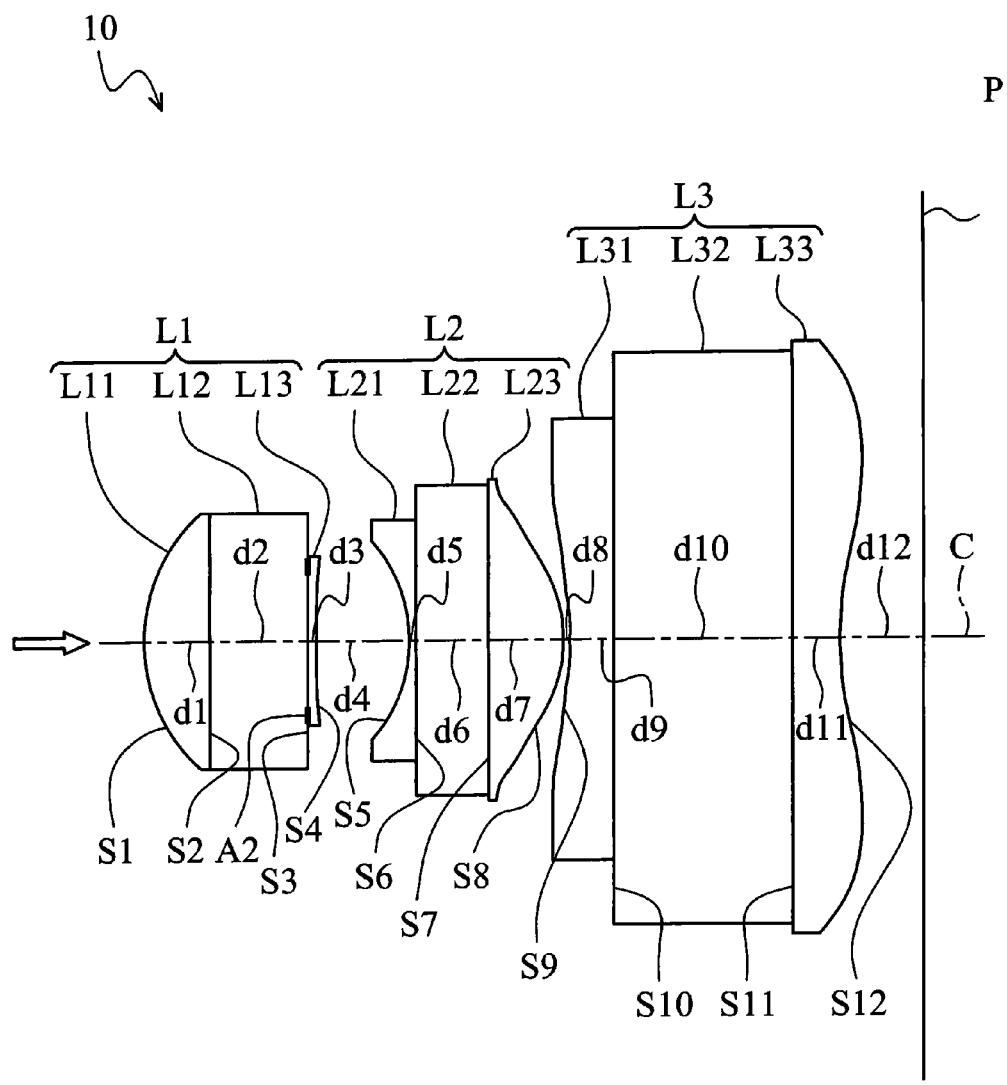
FIG. 3 is a perspective diagram of an optical lens module according to the second embodiment of the invention.

Referring to FIG. 3, the second embodiment of an optical lens module 10 has a configuration similar to the first embodiment (FIG. 1). However, the plane parallel plate L4 is omitted in FIG. 3. The optical lens module 10 primarily comprises a first lens L1, a second lens L2, and a third lens L3. Light can enter the first lens L1 from an object side and sequentially pass through the second lens L2, the third lens L3 to an image side. In this embodiment, an image sensing plane P of an imaging sensor, such as a CCD (Charge Coupled Device), is disposed on the image side of the lens module 10 to receive light.

As shown in FIG. 3, the first lens L1 may be a compound lens comprising three sub-lenses L11-L13. Similarly, the second lens L2 may be a compound lens comprising three sub-lenses L21-L23, and the third lens L3 may be a compound lens comprising three sub-lenses L31-L33. The sub-lenses L12, L22, and L32 may be plane parallel glass plates, and the other sub-lenses L11, L13, L21, L23, L31, and L33 may comprise curable resin material, such as transparent curable silicone resin or UV-curable material.

Specifically, an aperture stop A2 is formed on the surface S3 between the sub lenses L12 and L13 by wafer level processing. Since the aperture stop A2 is securely fixed and embedded in the first lens L1 by wafer level processing, accurate positioning and robust connection between the aperture stop A2 and the first lens L1 are achieved.

Table 2-1 and 2-2 illustrate the design parameters of the optical lens module 10 in FIG. 3, wherein the optical lens module 10 has a focal ratio F=2.8.

TABLE 2-1

| Surface | Radius of Curvature | Distance (mm) | Refractivity | Abbe Number |
|---|---|---|---|---|
| S1 | 1.02 | | | |
| | | d1 = 0.26 | 1.514 | 55 |
| S2 | ∞ | | | |
| | | d2 = 0.40 | 1.516 | 62.6 |
| S3 (aperture stop) | ∞ | | | |
| | | d3 = 0.04 | 1.514 | 55 |
| S4 | 7.09 | | | |
| | | d4 = 0.38 | | |
| S5 | −1.08 | | | |
| | | d5 = 0.02 | 1.596 | 29.5 |
| S6 | ∞ | | | |
| | | d6 = 0.30 | 1.516 | 62.6 |
| S7 | ∞ | | | |
| | | d7 = 0.30 | 1.596 | 29.5 |
| S8 | −0.80 | | | |
| | | d8 = 0.02 | | |
| S9 | −2.83 | | | |
| | | d9 = 0.19 | 1.596 | 29.5 |
| S10 | ∞ | | | |
| | | d10 = 0.70 | 1.516 | 62.6 |
| S11 | ∞ | | | |
| | | d11 = 0.20 | 1.52 | 49.5 |
| S12 | 1.85 | | | |
| | | d12 = 0.57 | | |

TABLE 2-2

| Surface | Aspheric Coefficiencies | | | | | | | |
|---|---|---|---|---|---|---|---|---|
| | K | A4 | A6 | A8 | A10 | A12 | A14 | A16 |
| S1 | 0.59340904 | −0.098518181 | 0.136881087 | −1.367852035 | 2.866029943 | −3.531880715 | | |
| S2 | | | | | | | | |
| S3 (aperture stop) | | | | | | | | |
| S4 | | −0.052231834 | −0.960150293 | 9.094109744 | −51.72644856 | 97.62887204 | | |
| S5 | −1.520016026 | −0.398174824 | −1.050751209 | 2.203085857 | 8.07797971 | −48.2366404 | | |
| S6 | | | | | | | | |
| S7 | | | | | | | | |
| S8 | −0.759397198 | 0.223016496 | 0.125163951 | 0.295573477 | 0.036553087 | −0.299417881 | | |
| S9 | | 0.007127642 | 0.377724517 | −0.481724539 | 0.271485131 | −0.060765726 | | |
| S10 | | | | | | | | |
| S11 | | | | | | | | |
| S12 | −13.15426958 | −0.124603675 | 0.057709964 | −0.027493173 | 0.006715297 | −0.001587988 | 0.000535084 | −8.51E−05 |

As shown in FIG. 3, Tables 2-1 and 2-2, the first lens L1 of the optical lens module 10 has a convex surface (surface S1) and a concave surface (surface S4), respectively, on an object side and an image side thereof The second lens L2 of the optical lens module 10 has a concave surface (surface S5) and a convex surface (surface S8), respectively, on an object side and an image side thereof. In this embodiment, the third lens L3 of the optical lens module 10 has a concave surface S9 on an object side thereof. Additionally, the third lens L3 further has a convex peripheral portion on an image side thereof. Referring to FIG. 1, the convex peripheral portion forms a surface S12 with a concave center on the image side, wherein the surface S12 has an inflection point. In some embodiments, the surface S9 of the third lens L3 can also be a convex surface.

Figure 4:
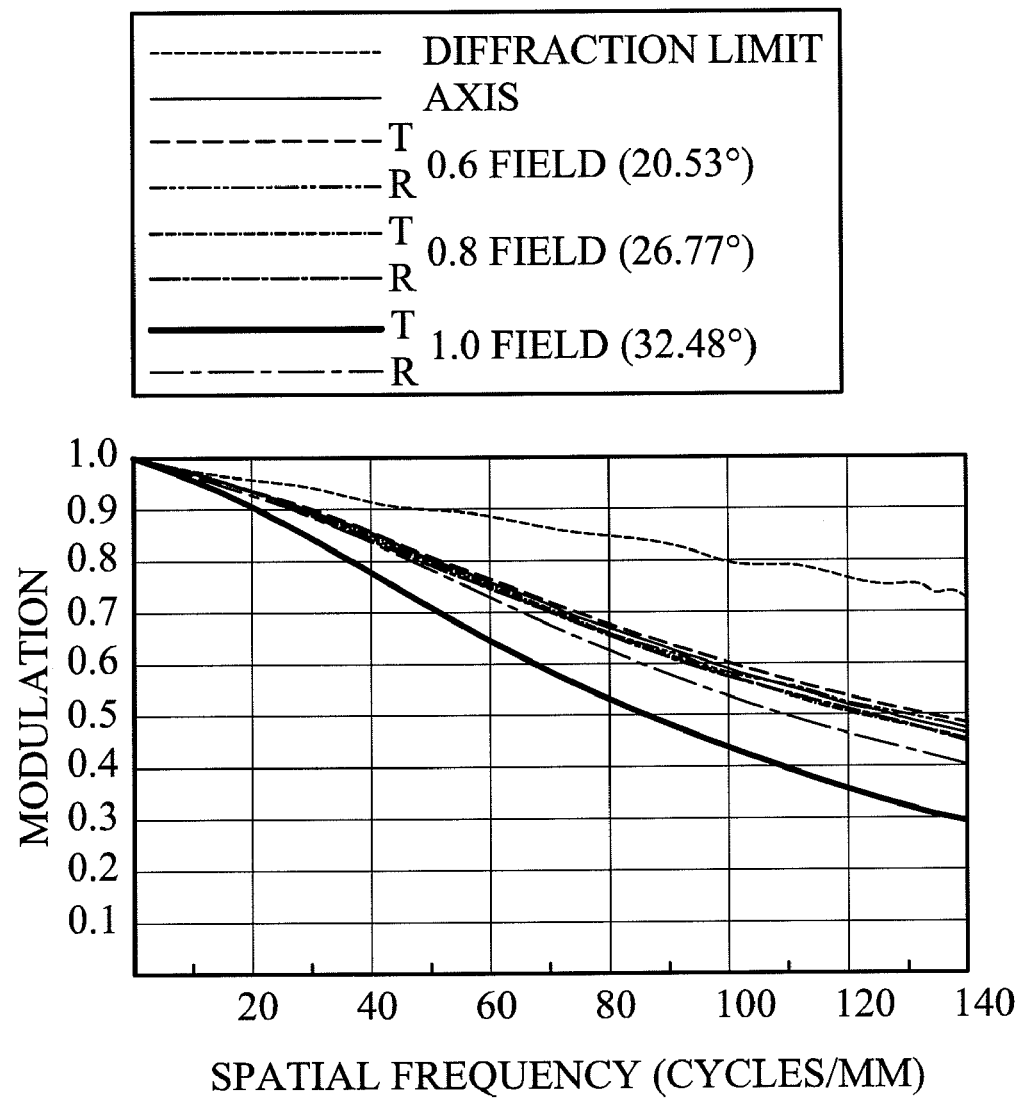
FIG. 4 is a Modulation Transfer Function (MTF) diagram showing several spatial frequency response curves according to the second embodiment of the invention.

The optical lens module 10 in FIG. 3 further complies with the conditions (1-1), (1-2), and (1-3) as disclosed in the first embodiment. FIG. 4 is a Modulation Transfer Function (MTF) diagram showing several spatial frequency response curves in accordance with the optical lens module 10 of FIG. 3. Referring to FIG. 4, the modulation value in the MTF diagram substantially exceeds 0.4 when the spatial frequency is below 100 cycles/mm. This denotes that the optical lens module 10 has good resolving power and contrast.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical lens module, comprising a first lens, a second lens, a third lens, and an aperture stop formed in the first lens, wherein
    the first lens, the second lens, and the third lens are sequentially arranged from an object side to an image side along an optical axis of the optical lens module,
    the first lens has a convex surface and a concave surface, respectively, on the object side and the image side,
    the second lens has a concave surface and a convex surface, respectively, on the object side and the image side, and
    the third lens has a convex peripheral portion on the image side and a concave surface on the object side, wherein the convex peripheral portion forms a surface with a concave center on the image side, and the surface has an inflection point.

2. The optical lens module as claimed in claim 1, wherein the optical lens module defines an optical length L from the object side of the first lens to an image sensing plane along the optical axis, and the first and second lenses form a distance D12 therebetween along the optical axis, wherein $0.2 > D12/L > 0.05$.

3. The optical lens module as claimed in claim 1, wherein the first lens has an effective focal length EFL1, and the second lens has an effective focal length EFL2, wherein $0.2 |EFL1|/|EFL2| < 1$.

4. The optical lens module as claimed in claim 1, wherein the first lens has an effective focal length EFL1, and the third lens has an effective focal length EFL3, wherein $|EFL3| > |EFL1|$.

5. The optical lens module as claimed in claim 1, wherein the optical lens module further comprises a plane parallel plate disposed on the image side of the third lens.

6. The optical lens module as claimed in claim 1, wherein the second and third lenses are compound lenses.

7. The optical lens module as claimed in claim 1, wherein the first lens is a compound lens comprising a first sub-lens, a second sub-lens, and a third sub-lens sequentially arranged from the object side to the image side along the optical axis, and the aperture stop is formed between the second and third sub-lenses.

8. The optical lens module as claimed in claim 7, wherein the first and third sub-lenses comprise curable resin material.

9. The optical lens module as claimed in claim 7, wherein the first and third sub-lenses comprise curable resin or UV-curable material.

10. The optical lens module as claimed in claim 7, wherein the second sub-lens is a parallel glass plate.

11. The optical lens module as claimed in claim 1, wherein the first lens is a compound lens comprising a first sub-lens, a second sub-lens, and a third sub-lens sequentially arranged from the object side to the image side along the optical axis, and the aperture stop is formed between the first and second sub-lenses.

12. The optical lens module as claimed in claim 11, wherein the first and third sub-lenses comprise curable resin material.

13. The optical lens module as claimed in claim 11, wherein the first and third sub-lenses comprise curable resin or UV-curable material.

14. The optical lens module as claimed in claim 11, wherein the second sub-lens is a parallel glass plate.

* * * * *